Nov. 24, 1931.   J. A. SMITH   1,833,001
COTTON TOPPER
Filed May 5, 1928   6 Sheets-Sheet 6
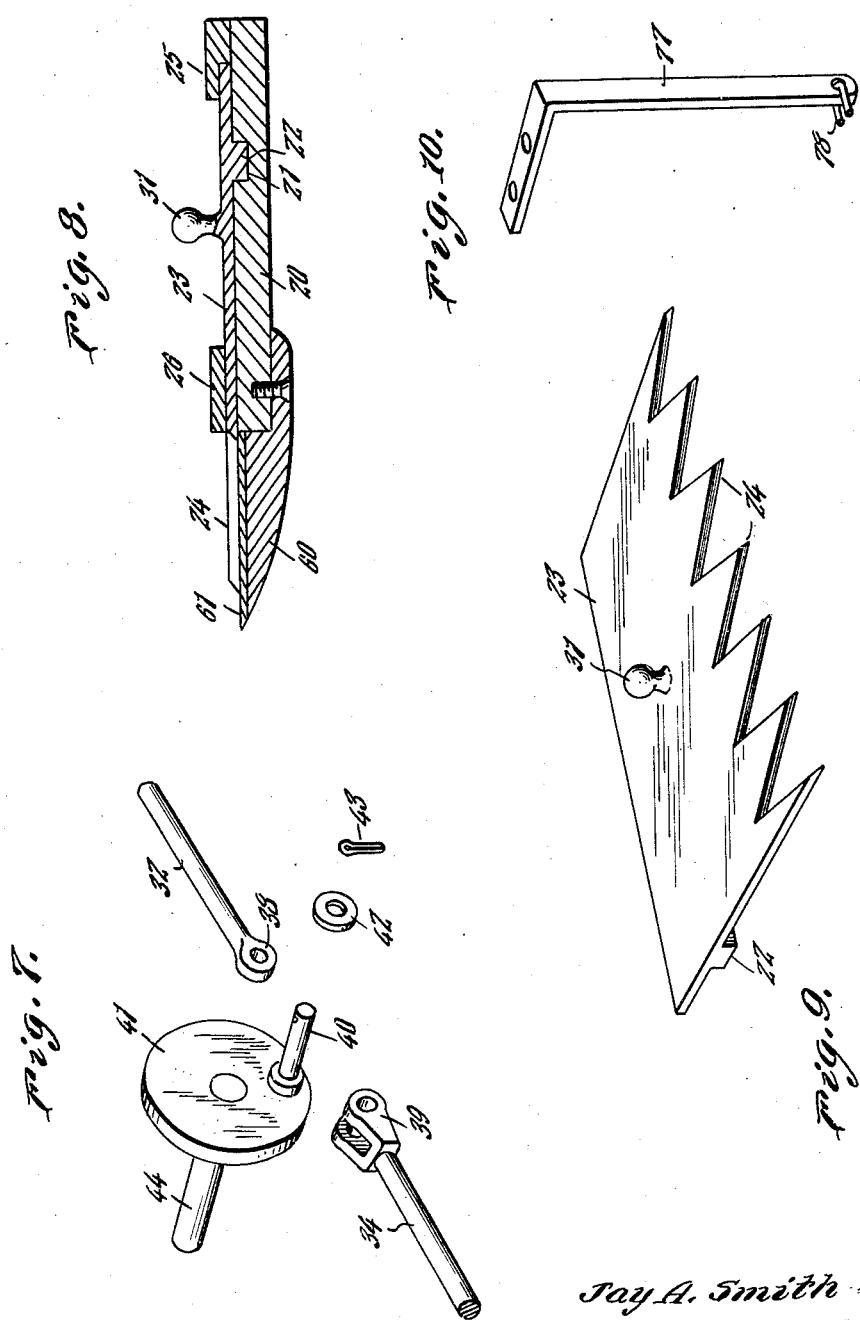
Inventor
Jay A. Smith
By Clarence A. O'Brien
Attorney Patented Nov. 24, 1931

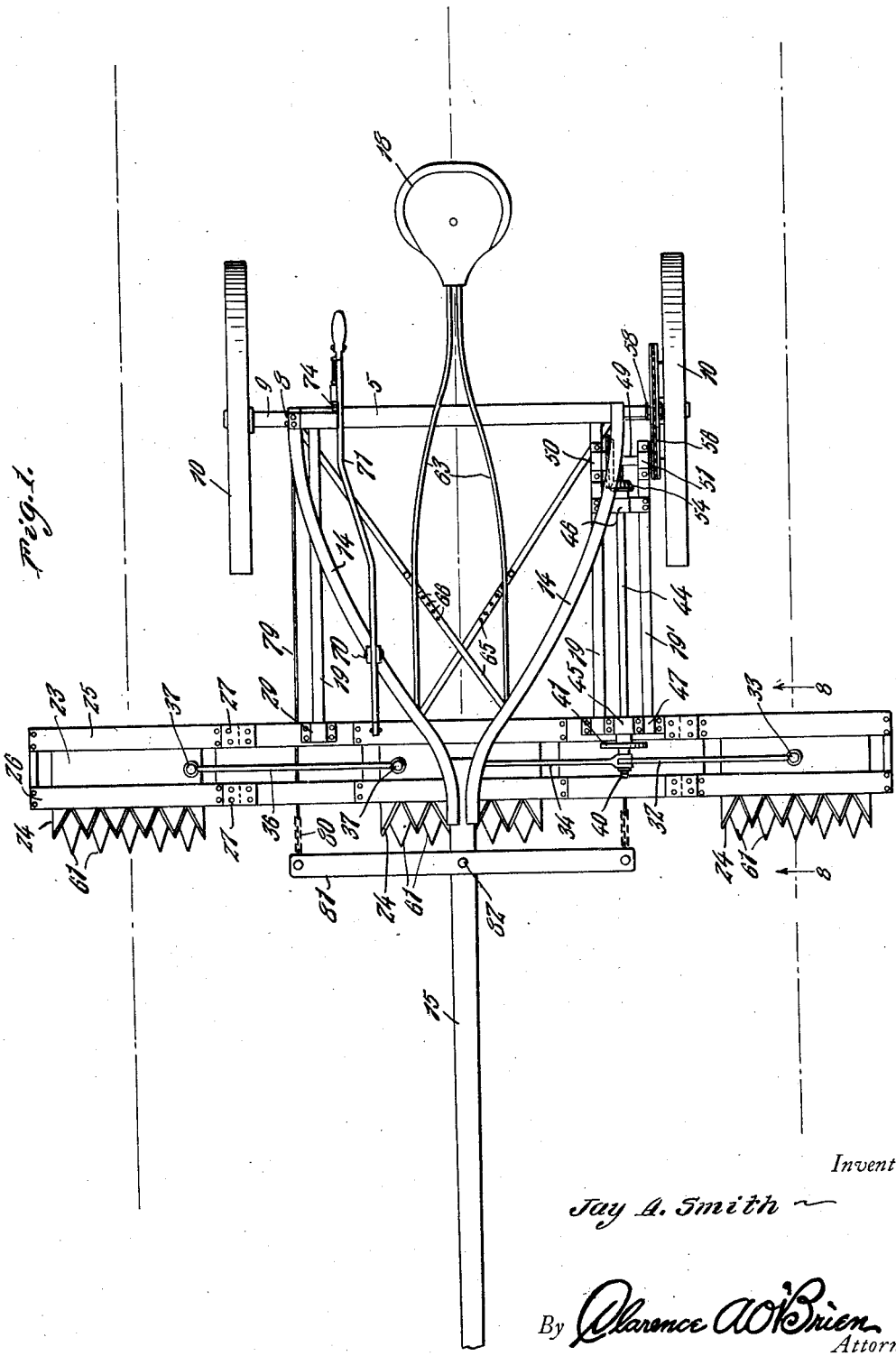

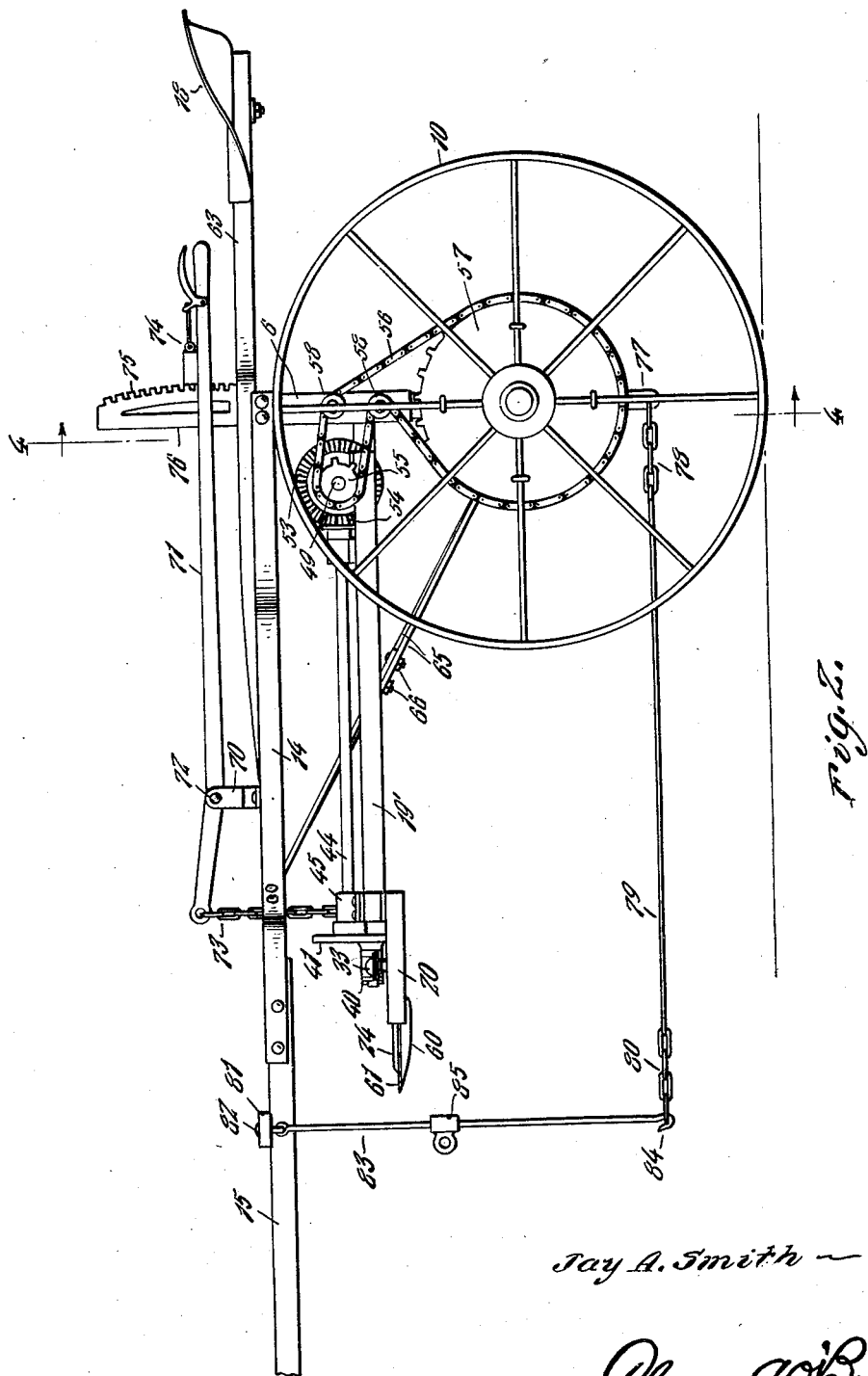

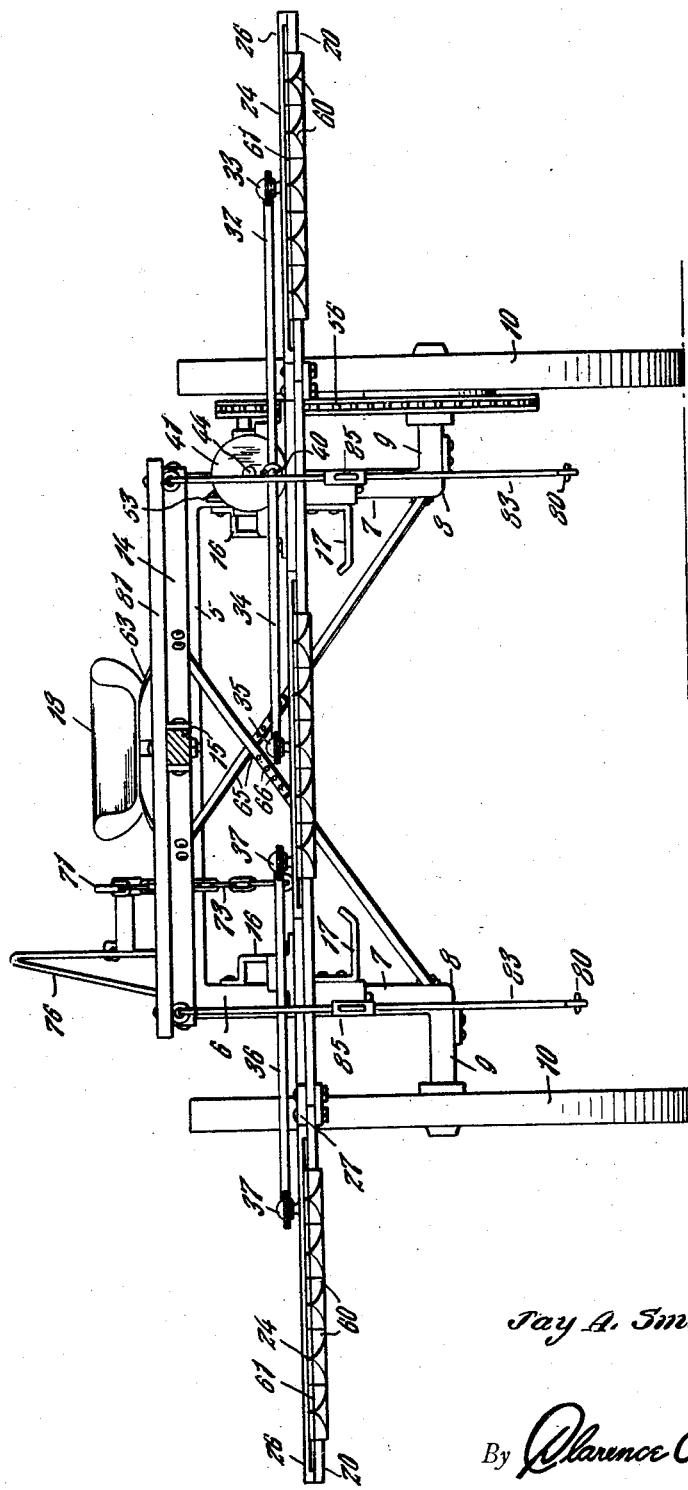

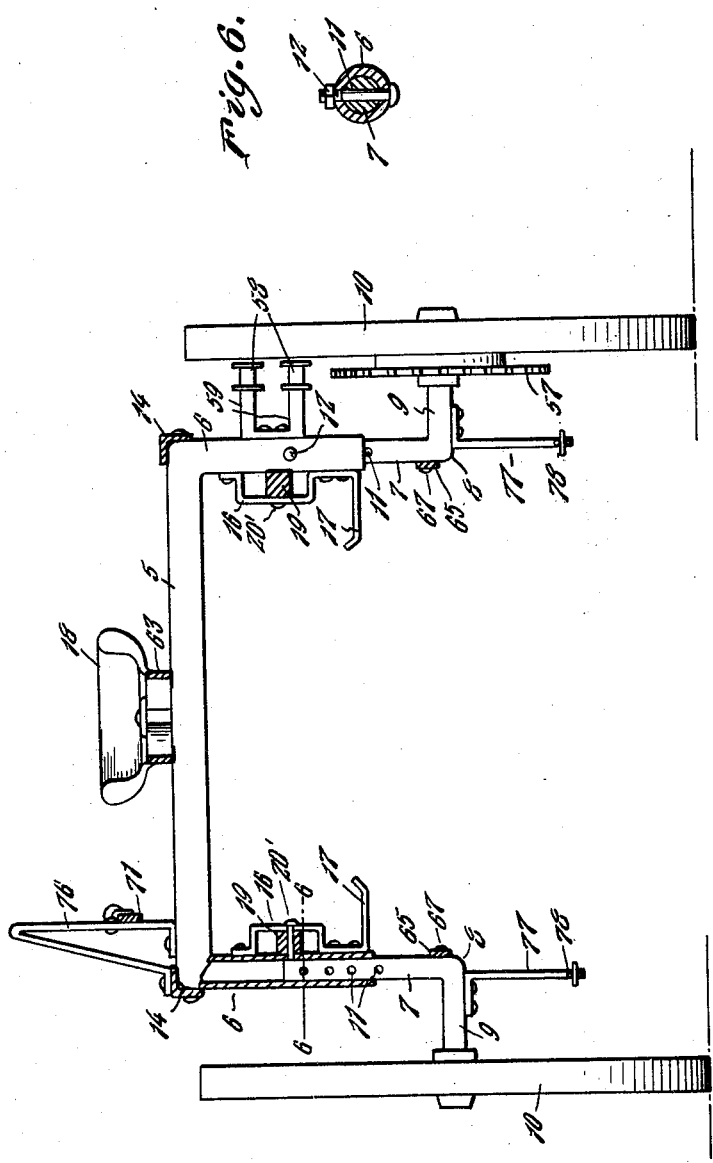

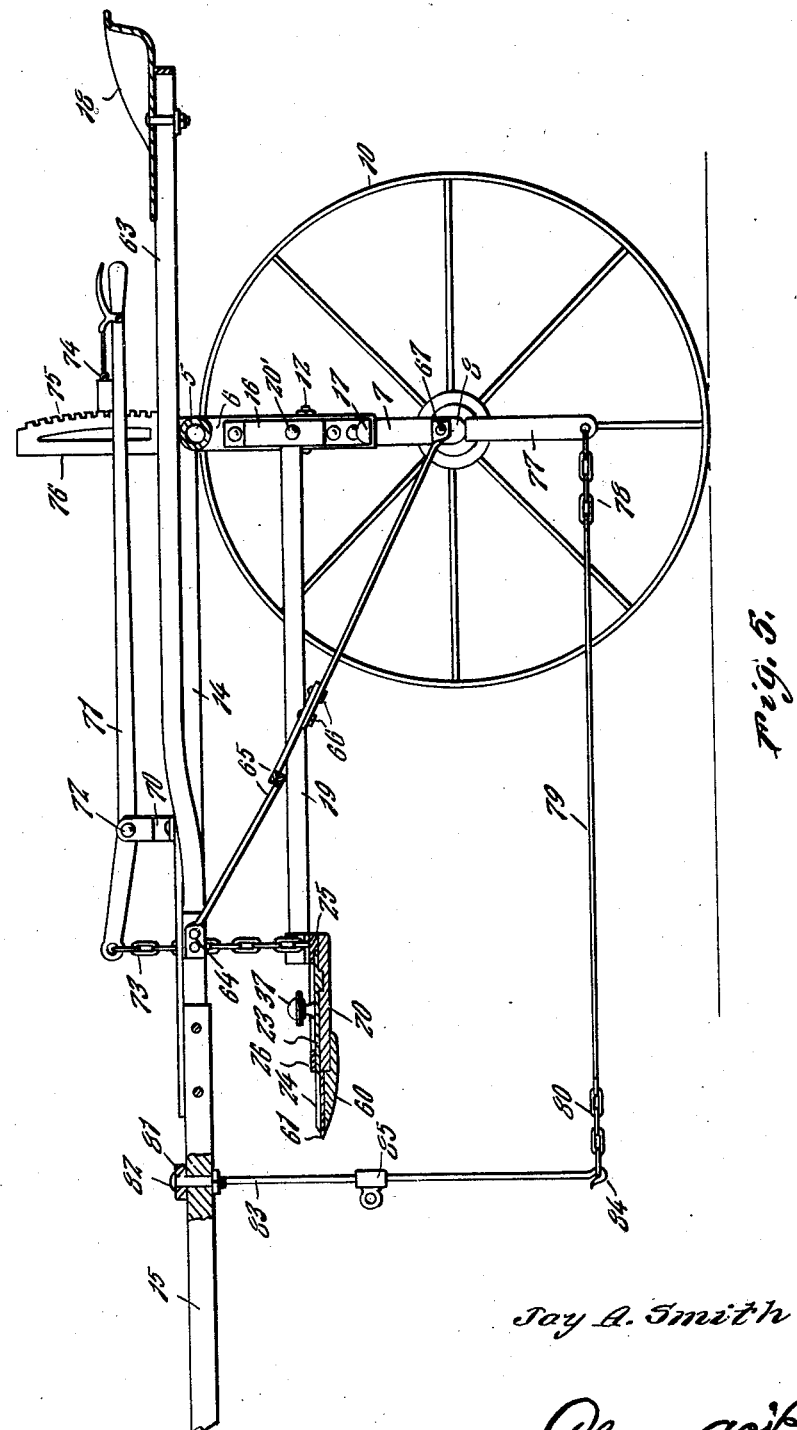

1,833,001

UNITED STATES PATENT OFFICE

JAY A. SMITH, OF HAMMON, OKLAHOMA

COTTON TOPPER

Application filed May 5, 1928. Serial No. 275,474.

The present invention relates to a machine for topping cotton, and has for its prime object to provide a structure wherein several rows of cotton may be topped at the same time.

Another very important object of the invention resides in the provision of a topping machine of this nature, which embodies the principle of a reciprocating cutter bar, swingably mounted on a frame, and means for adjusting the same.

Another very important object of the invention resides in the provision of a machine of this nature, having an adjustable frame structure.

A still further very important object of the invention resides in the provision of a cutter bar structure including a plurality of movable cutter bars, operatively connected together and driven by one of the wheels of the machine.

A further important object of the invention resides in the provision of a machine of this nature which is exceedingly simple in its construction, decidedly inexpensive to manufacture, strong and durable, compact and convenient in its arrangement of parts, easy to manipulate, thoroughly efficient and reliable in use and operation, and otherwise well adapted to the purpose for which it is designed.

With the above and numerous other objects in view, as will appear as the description proceeds, the invention resides in certain novel features of construction and in the combination and arrangement of parts as will be hereinafter more fully described and claimed.

In the drawings:

Figure 1 is a top plan view of the machine embodying the features of my invention.

Figure 2 is a side elevation thereof.

Figure 3 is a front elevation thereof.

Figure 4 is a vertical transverse section therethrough, taken substantially on the line 4—4 of Figure 2.

Figure 5 is a vertical longitudinal section therethrough.

Figure 6 is a transverse detail section, taken substantially on the line 6—6 of Figure 4.

Figure 7 is a perspective view of parts of the driving mechanism.

Figure 8 is a transverse section through the sickle bar structure, taken substantially on the line 8—8 of Figure 1.

Figure 9 is a perspective view of one of the movable cutting blades.

Figure 10 is a perspective view of a draft bracket.

Referring to the drawing in detail, it will be seen that the numeral 5 denotes a cross bar, forming the bight of an inverted U-shaped frame member with depending hollow legs 6, in which are adjustably mounted the upright arms 7, of L-shaped axle members 8, the horizontal portions 9 of which have wheels 10, journaled thereon. The legs 7 are provided with series of apertures 11, for receiving pins 12, extending through the legs 6. Thus, the height of the cross bar 5 may be adjusted. Angle iron braces 14 are secured to the ends of the bar 5 and project forwardly and the forward ends thereof converge together and are secured to the rear end of a tongue 15. Brackets 16 are secured to the legs 6 on the inner sides thereof and at their lower ends are provided with integral inwardly extending foot rests 17, so that a person on the seat 18 at the center of the bar may place his feet on said rest 17. A pair of bars 19 are pivoted as at 20' in the brackets 16 and extend forwardly. The cutter mechanism is mounted on the forward ends of these bars 19 as is clearly illustrated in Figure 1. The cutter mechanism includes an elongated transversely extending plate 20, having a plurality of elongated grooves 21, therein, for slidably receiving ribs 22, on the bottom surfaces of movable blades 23, having cutting teeth 24, projecting forwardly therefrom.

In the present example of the invention there are three of these cutter blades 23. Guides 25 and 26 are mounted on the plate 20, above the blades 23, and are connected together by strips 27, or in any other suitable manner, as is clearly illustrated in Figure 1. The bars are secured, by means of members 29, to the guides 25. The two end blades 23 are provided with upstanding balls 31, while the center blade is provided with two upstanding balls 31. A pitman 32 has a socket 33 at one end engaged with one end of the ball 31. A pitman 34 has a socket 35, at one end, engaged over one of the balls 31, on the intermediate blade 23. A link 36 is provided with sockets 37, at its ends, engaged with the remaining ball on the intermediate blade, and with the ball on the other end blade. The other end of the pitman 32 terminates in an eye 38, receivable between a bifurcated structure 39, on the other end of the pitman 34, and a pintle 40 eccentrically mounted on the disc 41 is insertable through the apertures of the eye 38 and the bifurcated structure 39, which are held thereon by means of washers 42 and cotter pins 43 or in any other suitable manner. The disc 41 is mounted on a shaft 44, which is journaled in the bearing 45 and a bearing 46. The bearing 46 is supported on the left hand bar 19, and on a bar 19', extending in spaced parallelism thereto, secured to the guide 25, as at 47, and to the bearing 46. A shaft 49 is journaled in a bearing 50 on said left hand bar 19 and in a bearing 51 on the rear end of the bar 19', and has a bevelled gear 53, thereon, meshing with a bevelled pinion 54, on the rear end of the shaft 44. On the outer end of the shaft 49 there is mounted a sprocket 55, over which is trained a chain 56, and this chain 56 is trained over a sprocket 57, fixed to the left hand wheel 10. The chain is further trained over idler rollers 58, journaled on the extremities of a U-shaped bracket 59, fixed on the outer side of the left hand leg 6. Thus it will be seen that as the machine progresses along, reciprocating motion is imparted simultaneously to the cutter blades of the cutter bar mechanism. Fingers 60 project forwardly from the plate 20, and are grouped in a plurality of series, one in front of each movable blade 23, and these fingers having cutting teeth 61 mounted on the upper surfaces thereof for cooperating with the teeth 24, as will be readily understood.

The seat 18 is supported on a pair of rods 63, longitudinally disposed of the machine, and extending across the central portion of the bar 5 and projecting forwardly from the bar 5 and secured as at 64, to the forward portions of the braces 14. Braces 65 are formed in adjustable sections connected together as at 66. The braces 65 are secured to the lower ends of legs 7, as is indicated at 67, and at 64, to the juncture of the braces 63, with braces 14. The braces 65 cross each other as is indicated to advantage in Figure 1.

The connections 66 between the sections of the braces 65 afford the necessary connections whenever the axles 8 are adjusted with respect to the legs 6.

A bracket 70 is secured to the intermediate portion of the right hand brace 14, and a lever 71 is pivoted, intermediate its ends, as at 72, to the bracket 70. A chain 73 is secured to the forward end of the lever and to the cutter bar mechanism. The lever 71 extends rearwardly and has a detent structure 74 on the rear end thereof cooperable with a rack 75 on a bracket 76 rising from the right hand end of the bar 5. Thus it will be seen that the cutter bar mechanism may be raised and lowered by proper manipulation of the lever 71, thus causing the swinging of the bars 19, as will be quite apparent.

A pair of inverted L-shaped brackets 77, depend from the arms 9 of the axles 8 and have links 78 secured thereto. Link rods 79 are secured to the links 78 and have links 80 at their forward ends. A bar 81 is pivoted as at 82, to the rear portion of the tongue 15, extending transversely thereof and having engaged on its ends rods 83 depending downwardly and terminating in hooks 84, with which links 80 are engageable. Brackets 85 are fixed to intermediate portions of the rods 83, so that whiffle trees may be attached thereto. Thus it will be seen that the draft animals pull forwardly through the rods 83, distributing the pull between the tongue and the bracket 77 and the draft animals are located in a path between which and to the outer sides of which the cutter bar mechanism will operate. The driver on the seat 18 will tend to counterbalance the weight of the cutter bar mechanism.

From the above detailed description it will be seen that I have devised an exceedingly simple machine, which is capable of topping several rows of cotton simultaneously, using the power created by the draft of the machine along the rows. It will further be seen that the machine is thoroughly adjustable so as to permit the topping operation at the desired height. The machine may be adjusted as far as the cutter bar mechanism is concerned, while it is in actual operation. Major operations of the frame structure, of course, will seldom be made. The structure may be manufactured strong and durable, and at a comparatively low cost, and yet may be made in such a manner as to be thoroughly efficient and reliable in its operation. The parts are arranged in a convenient and handy manner for necessary manipulation and yet are distributed so as to be comparatively compact.

It is thought that the construction, utility, operation, and advantages of this invention will now be quite apparent to those skilled in this art, without a more detailed description thereof.

The present embodiment of the invention has been disclosed in detail, merely by way of example, since in actual practice it attains the features of advantage enumerated as desirable in the statement of the invention and the above description.

It will be apparent that changes in the details of construction, and in the combination and arrangement of parts may be resorted to, without departing from the spirit or scope of the invention as hereinafter claimed, or sacrificing any of its advantages.

Having thus described my invention, what I claim as new is:

1. A cotton topping machine comprising in combination a plurality of longitudinally alined slidably supported cutter blades, and including end blades and an intermediate blade, link means operatively connecting one of the end blades with said intermediate blade, said intermediate blade and the other of said end blades being each provided with a pitman operatively connected therewith, and eccentric means operatively connecting said pitmen and including means for transmitting reciprocatory movement to all of said blades.

2. A cotton topping machine comprising in combination a plurality of cutter blades including a pair of end blades and an intermediate blade, a link operatively connecting one of said end blades with said intermediate blade, ball and socket means connecting said link with the referred to blades, a pitman having a ball and socket connection with said intermediate blade, a second pitman having a ball and socket connection with the other of said end blades a rotatably mounted shaft, a disc carried by said shaft, and an eccentric pin on the disc operatively connecting said pitmen for reciprocating the blades during rotation of the shaft.

3. A cotton topping machine comprising a wheeled frame, a central topper mechanism supported on the frame, and side topping mechanisms supported on the frame and arranged on opposite sides of the central topping mechanism, each of said topping mechanisms including a reciprocating cutting blade, a link operatively connecting the cutting blade of the central topping mechanism with the cutting blade of one of said side topping mechanisms, a pitman operatively connected with the cutting blade of said central topping mechanism, a pitman operatively connected with the cutting blade of the other of said side topping mechanisms, a rotatably mounted shaft, and eccentric means operatively connecting the free ends of said pitmen with one another and with said shaft.

In testimony whereof I affix my signature.

JAY A. SMITH.